(12) United States Patent
Wang

(10) Patent No.: US 9,094,430 B2
(45) Date of Patent: Jul. 28, 2015

(54) METHOD FOR IDENTIFYING SMART METERS IN A SMART GRID

(75) Inventor: Sibing Wang, Shanghai (CN)

(73) Assignee: Atmel Corporation, San Jose, CA (US)

( * ) Notice: Subject to any disclaimer, the term of this patent is extended or adjusted under 35 U.S.C. 154(b) by 662 days.

(21) Appl. No.: 13/254,439

(22) PCT Filed: Aug. 11, 2011

(86) PCT No.: PCT/CN2011/078256
§ 371 (c)(1),
(2), (4) Date: Jan. 27, 2012

(87) PCT Pub. No.: WO2013/020291
PCT Pub. Date: Feb. 14, 2013

(65) Prior Publication Data
US 2013/0038467 A1   Feb. 14, 2013

(51) Int. Cl.
| | | |
|---|---|---|
| *G08B 23/00* | (2006.01) | |
| *G08B 25/00* | (2006.01) | |
| *G08C 19/12* | (2006.01) | |
| *G08C 19/16* | (2006.01) | |
| *H04L 29/08* | (2006.01) | |
| *H04L 12/24* | (2006.01) | |
| *H04L 29/12* | (2006.01) | |

(52) U.S. Cl.
CPC ............... *H04L 67/12* (2013.01); *H04L 41/12* (2013.01); *H04L 61/2038* (2013.01); *Y02B 90/246* (2013.01); *Y04S 20/42* (2013.01)

(58) Field of Classification Search
CPC ..... H04L 61/2038; H04L 67/12; H04L 41/12; H04L 29/12254; H04L 12/403; H04L 1/0061; H04L 63/1416; H04L 63/1433; H04L 12/5692; Y02B 90/246; Y02B 90/241; Y04S 40/164; Y04S 20/48; Y04S 20/42; Y04S 20/32; G06F 13/42; G06F 2213/0052; H04Q 2209/60

USPC .......... 340/870.02, 541, 547, 531, 10.4, 538, 340/538.17, 637, 13.23, 288, 870.16, 7.37, 340/870.03; 709/217, 223, 224; 370/229, 370/230.1, 254, 328, 389, 395.42, 466, 230, 370/318; 705/51; 702/60
See application file for complete search history.

(56) References Cited

U.S. PATENT DOCUMENTS

| | | | | |
|---|---|---|---|---|
| 2006/0085346 | A1* | 4/2006 | Riley .............................. | 705/51 |
| 2007/0156840 | A1* | 7/2007 | Bashford et al. .............. | 709/217 |
| 2007/0294443 | A1* | 12/2007 | Berenbaum et al. .......... | 710/104 |
| 2010/0176931 | A1* | 7/2010 | Bennett ........................ | 340/10.4 |
| 2011/0208849 | A1* | 8/2011 | Barnett et al. ................ | 709/223 |

FOREIGN PATENT DOCUMENTS

| | | |
|---|---|---|
| CN | 18632190 A | 11/2006 |
| WO | WO 2009/010745 A1 | 1/2009 |

OTHER PUBLICATIONS

PCT International Search Report and the Written Opinion mailed Mar. 1, 2012, in related Application No. PCT/CN2011/078256.

* cited by examiner

*Primary Examiner* — Mirza Alam
(74) *Attorney, Agent, or Firm* — Fish & Richardson P.C.

(57) ABSTRACT

A method for providing an identification of individual smart meters among a plurality of smart meters communicably coupled in a networked grid area based on a unique identification number stored in the memory of the smart meter is provided. The method includes calculating a first value corresponding to the unique identification number, receiving a query message including a second value corresponding to the unique identification number of one of the plurality of smart meters and determining if the first value matches the second value. The method further includes sending a response message including the unique identification number if the first value matches the second value. The method may further include assigning logical identification numbers to each of the smart meters.

20 Claims, 3 Drawing Sheets

METHOD FOR IDENTIFYING SMART METERS IN A SMART GRID

BACKGROUND

1. Technical Field

The present disclosure is related to smart meters arranged in a smart grid. In particular, the present disclosure is related to methods for polling and identifying the individual smart meters in a smart grid by a utility provider or host device.

2. Discussion of Related Art

Traditional power grids transmit power from a limited number of central power generators to many users. However, traditional power grids are more or less the same as they have been since the beginning of the 20th century, and have not kept up with advances in technology. Consequently, there has been a push to switch many traditional power grids to a more modern smart grid. A smart grid has the capabilities of delivering electricity to consumers using digital technology with two-way communications to, among other things, control appliances at consumers' homes to save energy, reduce cost and increase reliability. Smart grids may be made possible by applying sensing, measurement and control devices with two-way communications to electricity production, transmission, distribution and consumption parts of the power grid that communicate information about grid condition to system users, operators and automated devices, making it possible for users and the devices connected to the grid to dynamically respond to changes in grid condition.

A smart grid would include an intelligent monitoring system with two-way communication capabilities that keeps track of all electricity flowing in the system. As part of the intelligent monitoring system, smart meters may be installed at locations across the grid. A smart meter is the term given to utility (i.e., electrical, water, or natural gas) consumption meters that have additional functionality. For example smart meters can record consumption in intervals of an hour or less, and the consumption information can be communicated to the utility or the consumer via a communications network. Smart meters may also include real-time or near real-time sensors, and be configured to provide utility outage notifications to the utility as well as the consumer.

An important technology in making a smart grid work is automatic meter reading (AMR). AMR is the technology of automatically collecting consumption, diagnostic, and status data from utility meters, including smart meters. The collected data can then be transferred to a central database for billing, troubleshooting, and analyzing. AMR provides multiple benefits over current technologies. For example, AMR eliminates the need of a utility representative to physically travel to a consumer's location and perform a manual reading of the meter. AMR also provides for the ability to bill based on real-time or near real-time consumption instead of traditional methods of billing based on previous or predicted consumption, and allows both utility providers and consumers to better control the use and production of utility services.

However, AMR requires that a central, or host computer, often at the utility provider but sometimes in the grid, occasionally poll the meters to determine how many meters are connected to the grid as well as the identification number of each meter. A utility provider representative can go into the field, physically inspect each meter, and then manually input the identification number of each meter into the central computer. This approach takes a considerable amount of time and increases the probability of mistakes arising through human error. For smart meters or other types of devices which are communicatively coupled to the central computer, the central computer can poll each of the devices connected to the central computer to determine the identification number of each device and the total number of devices. However, the identification number is often long and polling all of the devices for each number can take quite some time. Binary searching has been proposed as an alternative, which reduces the searching space and speeds up the searching time. However, a binary search requires a mask having the same bit length as the identification numbers to be on the channel. These bit lengths may are long enough to be easily corrupted by noise. Moreover, in an ideal case, the complexity of binary searching is $N*\log_2 L$, where N is the number of devices connected to a host or master device, and L is the bit length of the identification number. Furthermore, because in a binary search the mask only masks half of the devices, the other half of the devices will respond to a host or master device, increasing the probability of conflicts. Accordingly, there is a need to provide for a better system for determining the number of devices connected to a grid, the identification number of each device on the grid, and for searching for a particular device on the grid.

SUMMARY

Consistent with some embodiments, there is provided a method for providing an identification of individual smart meters among a plurality of smart meters communicably coupled in a networked grid area based on a unique identification number stored in the memory of the smart meter. The method includes calculating a first value corresponding to the unique identification number, receiving a query message including a second value corresponding to the unique identification number of one of the plurality of smart meters and determining if the first value matches the second value. The method further includes sending a response message including the unique identification number if the first value matches the second value.

Consistent with some embodiments, there is also provided a method for identifying individual smart meters among a plurality of smart meters in a networked grid area by a host device, the host device including a processor, a memory, and a communications interface, the memory including instructions for execution by the processor for performing the method, the method including the steps of sending a query message to the smart meters in the networked grid area, wherein the query message including a first value corresponding to a unique identification number of an individual smart meter of the plurality of smart meters. The method also includes the steps of receiving a response message from the individual smart meter having the unique identification number, assigning a logical identification number to the individual smart meter, storing the logical identification number and the unique identification number in a memory of the smart meter, and sending the logical identification number to the individual smart meter.

Further consistent with some embodiments, there is also provided a smart grid having at least one host device and a plurality of smart meters, the host device and the plurality of smart meters being communicably coupled in the smart grid. The identity of the smart meters in the smart grid may be determined by performing a method including calculating a first value corresponding to an identification value unique to each smart meter, sending a query message to the plurality of smart meters in the smart grid, wherein the query message including a second value corresponding to the identification value unique to each smart meter. The method also includes receiving the query message, determining if the second value matches the first value, and sending a response message if the second value matches the first value.

These and other embodiments will be described in further detail below with respect to the following figures.

Figure 1:
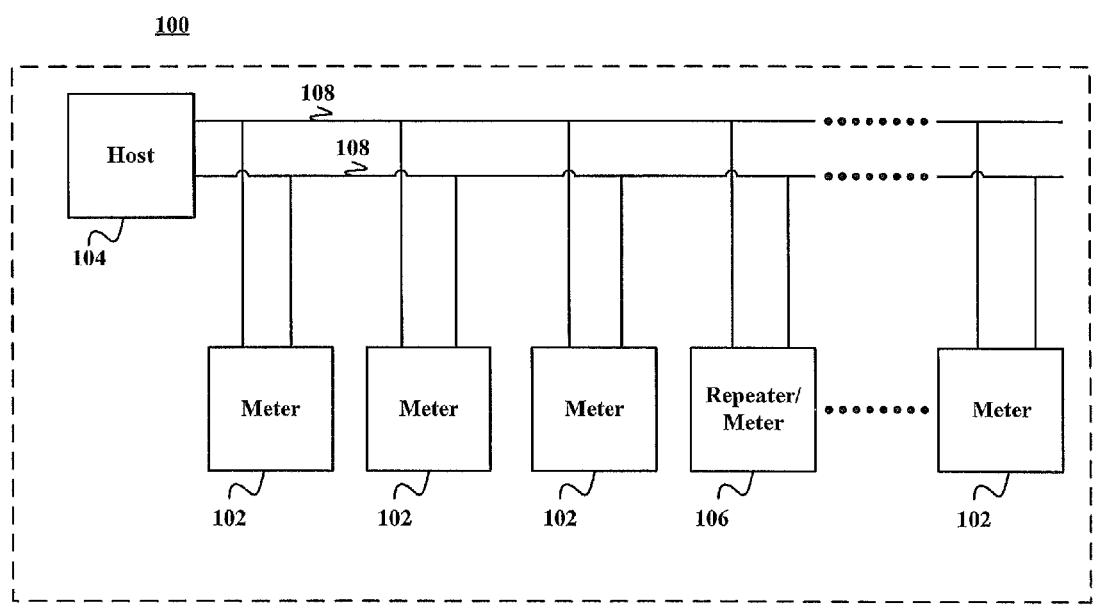
FIG. 1 is a diagram illustrating an arrangement of smart meters in a grid area, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 is a diagram illustrating an arrangement of smart meters in a grid area, consistent with some embodiments. As shown in FIG. 1, a grid area 100 includes a plurality of smart meters 102 and at least one host 104. Smart meters 102 may be meters that are capable of metering a utility, such as power, energy, and/or water, consumed by a consumer, and, when part of a smart grid having power line communication (PLC), communicating the metered values to the utility vendor or utility provider. Consistent with some embodiments, a repeater 106 may be configured to act as a host 104 while still retaining the functionality of smart meter 102 and be capable of metering a utility, such as power, energy, and/or water, consumed by a consumer, but also including additional instructions stored in a memory for initiating an algorithm that polls and identifies smart meters 102 in grid area 100, as will be explained in FIG. 3. In some embodiments, host 104 may not be a smart meter but instead be a processing device, such as a computer, that is coupled to the grid area 100 through the internet, a network, or through PLC, and includes at least instructions for initiating an algorithm that locates smart meters 102 in grid area 100. For example, host 104 may be located at a utility vendor site.

Returning to FIG. 1, smart meters 102 are coupled together throughout grid area 100 through connection 108. According to some embodiments, connection 108 may be a power line connection, such that smart meters 102 are coupled together via power lines in a transformer area. In such embodiments, connection 108 may be capable of supporting power line communication, including broadband over power lines (BPL), such that the smart meters 102 in grid area 100 form a network and may communicate with one another and to a utility vendor (not shown) through connection 108. In other embodiments, smart meters 102 may include wireless communication capabilities such that the smart meters are coupled together and to a utility vendor using wireless technologies. Such wireless technologies may include, but are not limited to, radio frequency (RF), Wi-Fi™, Bluetooth™, ZigBee™, or Wavenis wireless technologies. By providing communication capabilities between smart meters 102, smart meters 102 in grid area 100 may form a "smart grid."

Although FIG. 1 only illustrates grid area 100 as including 4 smart meters 102, a single host 104, and a single repeater 106, a grid area 100 may have many more or many fewer smart meters, hosts, and/or repeaters. In some embodiments, grid area 100 may have about three hundred smart meters.

Figure 2:
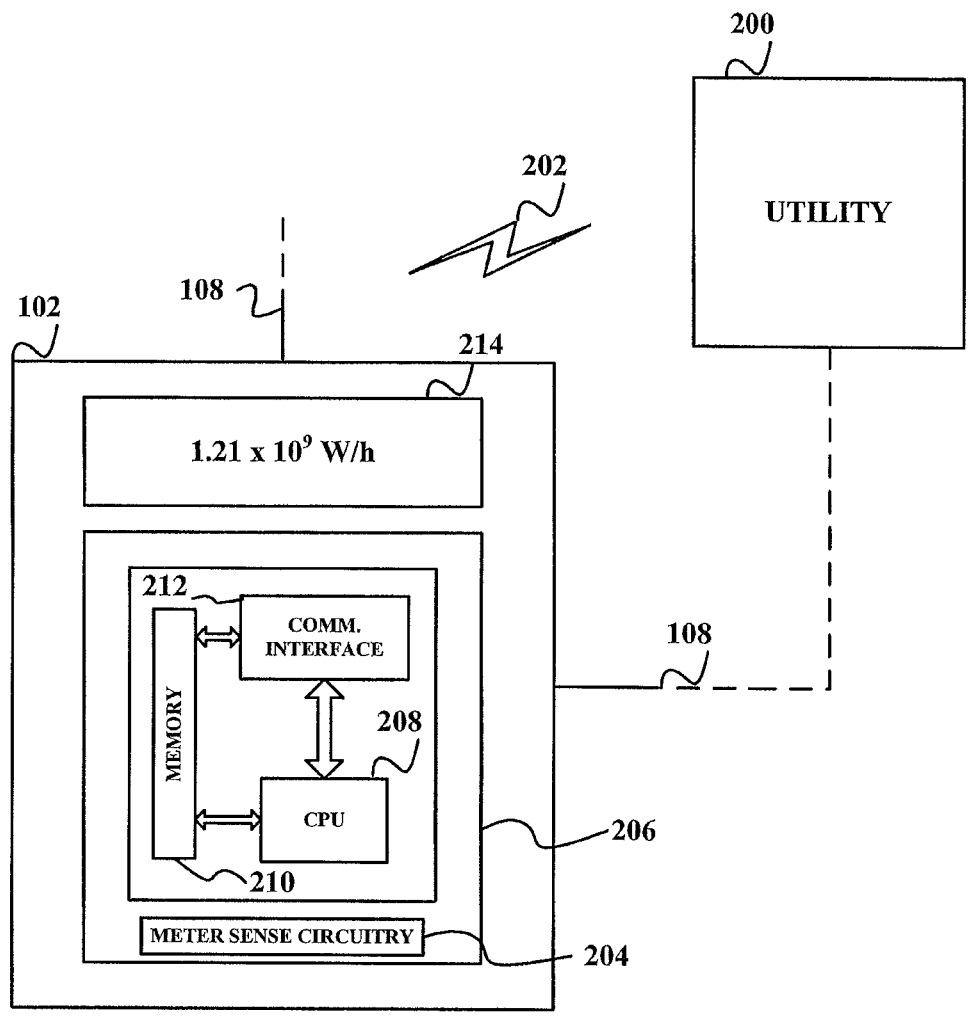
FIG. 2 is a diagram illustrating a smart meter according to some embodiments.

FIG. 2 is a diagram illustrating a smart meter according to some embodiments. As shown in FIG. 2, smart meter 102 is coupled to other smart meters (not shown) via connection 108. Consistent with some embodiments, smart meter 102 may also be coupled to utility vendor or provider 200 via connection 108 or via a wireless connection 202. Consistent with further embodiments, smart meter 102 may be coupled to a host 104 or repeater 106 (not shown) via connection 108 or wireless connection 202, or, in yet other embodiments, a smart meter 102 may act as a repeater 106 and may be used as a host 104. Through wireless connection 202 or connection 106, smart meter 102 may provide metering information to utility vendor or provider 200, such as energy, power, and/or water usage. Metering information may be determined by meter sense circuitry 204 included as electronics 206 in smart meter 102.

Consistent with some embodiments, smart meter 102 may include a processor, such as CPU 208, coupled to a memory 210, both of which may be coupled to a communications interface 212. Communications interface 212 may be used to facilitate communications with other smart meters 102, utility vendors/providers 200, and host 104, over connection 106 or wireless connection 202. Smart meter 102 may further include a display 214 which may provide metering information, such as a current usage of power, energy, or water. Consistent with some embodiments, display 214 may be a quartz display, a dial, a liquid crystal display (LCD), a organic light emitting diode (OLED) display, or a light emitting diode (LED) display.

Memory 210 may store information about the smart meter, such as the unique ID of the smart meter. Memory 210 may further store instructions for execution by the processor to perform specific functions. For example, in some embodiments, CPU 208 may be configured to execute instructions stored in memory 210 to execute algorithms for analyzing metering information and transmitting metering information to utility vendor/provider 200 through communications interface 212. Consistent with some embodiments, CPU 208 may be configured to execute instructions stored in memory 210 to perform an algorithm for locating and identifying other smart meters 102 in a grid area 100. In particular, if smart meter 102 is a repeater 106 and used as a host 104, memory 210 may store instructions for generating pick-up messages for locating and identifying all smart meters 102 in grid area 100, and assigning logical IDs to identified smart meters 102. Or, memory 210 may include instructions for responding to a pick-up message generated by host 104, receiving an acceptance message from host 104, and storing a logical ID generated by host 104.

Figure 3:
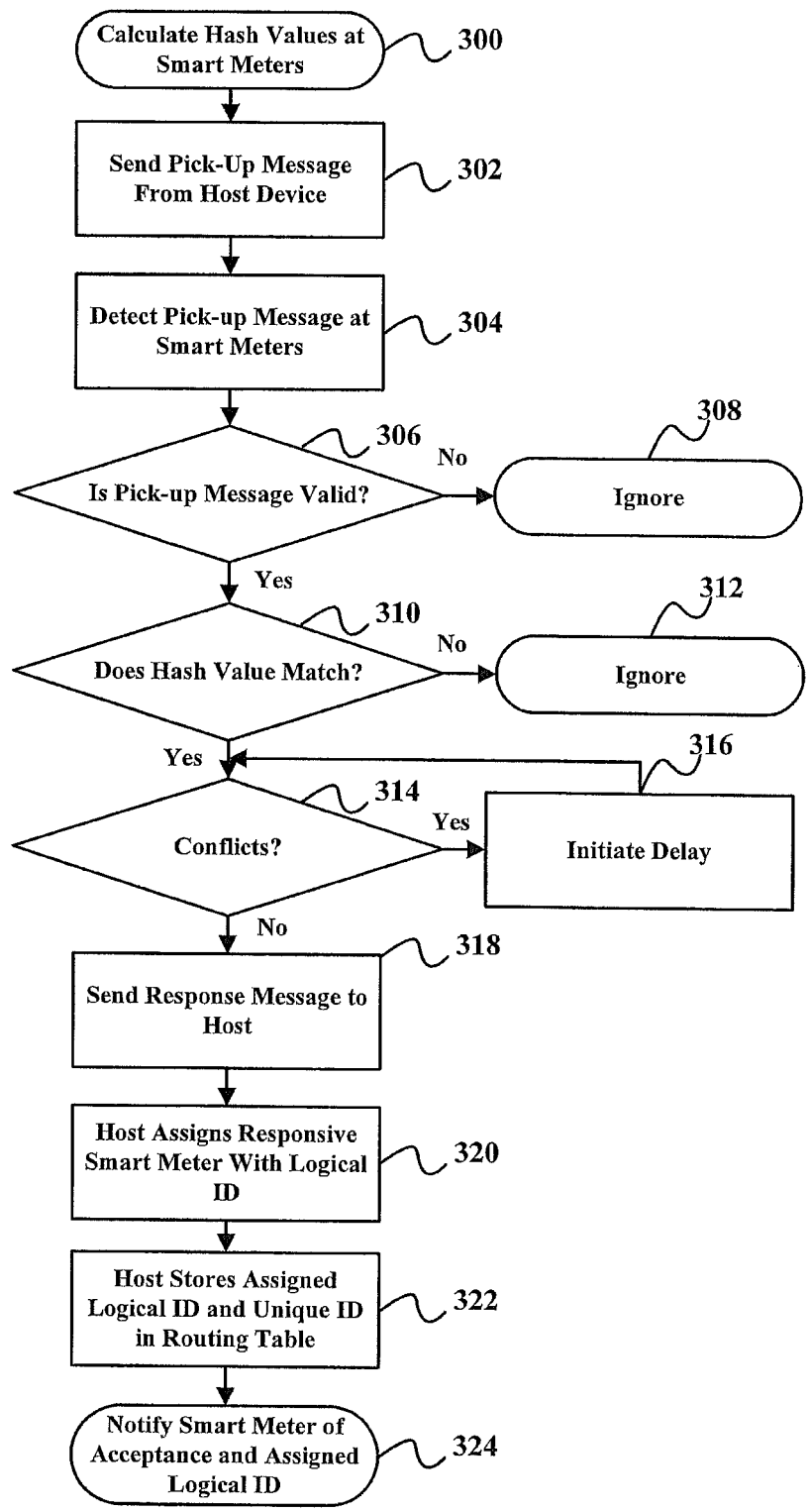
FIG. 3 is a flowchart illustrating an algorithm for locating and identifying other smart meters in a grid area.

FIG. 3 is a flowchart illustrating an algorithm for locating and identifying smart meters in a grid area. The algorithm illustrated in FIG. 3 will be discussed in conjunction with FIGS. 1 and 2, for the purposes of illustration. Consistent with some embodiments, steps of the algorithm may be executed by processors 208 of smart meters 102 and/or host 104, wherein, in some embodiments, host 104 may be a repeater 106 or another processing device. Moreover, the algorithm illustrated in FIG. 3 may be used for locating and identifying smart meters in a grid area which may be coupled together and to a host through power line connection (PLC) or wirelessly, such that the smart meters in the grid area form a network. Furthermore, the algorithm illustrated in FIG. 3 may be used following a new installation or an upgrade of legacy meters to smart meters. In such situations, the unique IDs of each of the smart meters in the grid area are not known to the utility vendor or operator or, the number of smart meters in the grid area is not known. Thus, smart meter 102 will not have an assigned logical ID stored in memory 210. When there is no assigned logical ID, CPUs 208 of smart meters 102 execute instructions stored in memory 210 to calculate a hash value based on its stored unique ID (Step 300). The hash value may be calculated using any known hash function, such as MD5, SHA-1, or CRC. The generated hash value may then be stored in memory 210.

Similarly, a host device 104 will be programmed to execute a pick-up function for locating specific slave devices in a grid area 100. Host 104 will proceed to send a pick-up message (Step 302) to all smart meters 102 in grid area 100 which may be networked via PLC or wirelessly, as discussed above. Consistent with some embodiments, pick-up message may be sent over a dedicated broadcast channel in the PLC or wireless network of grid area 100 designed for receiving important messages such as pick-up messages. The pick-up message includes a hash value designating a specific smart meter 102 in grid area 100. Consistent with some embodiments, the pick-up message may further include a header and cyclic redundancy check (CRC) bits, or checksum bits. One example of a pick-up message is illustrated below:

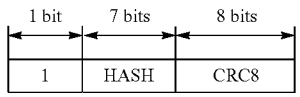

According to some embodiments, pick-up messages generated and sent out by host device 104 includes iteratively generated hash values to scan for all available smart meters 102.

The sent pick-up message is detected and received at all smart meters 102 in grid area 100 (Step 304). CPUs 208 of smart meters 102 then execute instructions in memory 210 to first determine whether the received pick-up message is valid (Step 306). Message validity may be determined by analyzing the CRC information included in the pick-up message or otherwise comparing the CRC information in the pick-up message to CRC values generated at smart meters 102. If the pick-up message is not determined to be valid, it is ignored (Step 308). If the pick-up message is determined to be valid, processors 208 in smart meters 102 execute instructions stored in memory 210 to determine if the hash value received in the pick-up message matches the hash value stored in memory 210 generated based on the unique ID of smart meter 102 (Step 310). If the received hash value does not match the stored hash value, smart meter 102 ignores the pick-up message (Step 312). If the received hash value matches the stored hash value, smart meter 102 will prepare to send a response message to host 104 by checking for conflicts on the network (Step 314). Conflicts may arise on the dedicated channel of the PLC or wireless network when host 104 is transmitting a message or another smart meter 102 is sending a response. If conflicts are detected, CPU 208 of smart meter 102 initiates a delay (Step 316). After the delay has expired, smart meter 102 will again check for conflicts (Step 314) and continue initiating a delay (Step 316) until there are no conflicts detected on the grid network. Similarly, in case conflicts interfere with the sending of a pick-up message from host 104, host 104 will continue to send the same pick-up message until a response has been received.

Once there are no conflicts detected on the grid network, smart meter 102 sends a response message to host 104 (Step 318). Consistent with some embodiments, response message includes the unique ID value of smart meter 102 along with a CRC value or checksum bits to show validity. One example of a response message is shown below:

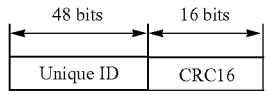

The response message is then transmitted to host 104 over the grid network.

After receiving the response message from smart meter 102, a processor of host 104 executes instructions for assigning a logical ID to the responsive smart meter 102 (Step 320). The assigned logical ID and the received unique ID are then stored as a pair in a routing table stored in a memory of host 104 (Step 322). Host 104 then sends a message to the responsive smart meter 102 using the received unique ID that the responsive smart meter 102 has been accepted as part of the grid network along with the responsive smart meter's 102 assigned logical ID (Step 324). Steps 302-324 are repeated for all smart meters 102 in grid area 100. That is, host 104 continues to scan the network by generating pick-up messages having iterative hash values until the entire hash value space has been scanned and/or until all smart meters 102 in grid area 100 have responded and been added to the routing table of host 104. Once the routing table of host 104 has been populated, searching for a particular smart meter 102 may be done by matching the assigned logical ID of smart meter 102 with the unique ID of smart meter 102.

By providing instructions for carrying out an automated scan of smart meters in a grid area, the unique IDs of all of the smart meters in a grid area may be determined without having to send a technician into the field to manually determine the unique IDs of each of the smart meters in the grid area. Moreover, by mapping the unique IDs to a hash value, the host can scan from, for example 0-127 for a 7-bit hash value, which significantly reduces the amount of time and bandwidth needed to determine the unique IDs of all of the smart meters in the grid area. Consequently, embodiments as described herein may provide a better system for determining the number of devices connected to a grid, the identification number of each device on the grid, and for searching for a particular device on the grid. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A method for providing an identification of individual smart meters among a plurality of smart meters communicably coupled in a networked grid area, each smart meter in the grid area having a memory, a unique identification number stored in the memory, a processor, and a communications interface, the memory including instructions for execution by the processor for performing the method, the method comprising:

calculating, by the processor, a first value corresponding to a first unique identification number of the smart meter;

receiving, by the communications interface, a query message including a second value corresponding to a second unique identification number of one of the plurality of smart meters;

determining, by the processor, that the calculated first value corresponding to the first unique identification number of the smart meter matches the second value included in the received query message; and in response to determining that the calculated first value corresponding to the first unique identification number of the smart meter matches the second value included in the received query message, sending, by the communications interface, a response message including the first unique identification number of the smart meter.

2. The method of claim 1, wherein the query message is ignored if the first value differs from the second value.

3. The method of claim 1, further comprising:

determining, by the processor, validity of the received query message, wherein the received query message includes cyclic redundancy check (CRC) information for the second value, and wherein determining the validity of the received query message includes comparing the CRC information in the received query message to one or more CRC values generated at the smart meter for the received query message.

4. The method of claim 3, wherein the query message is ignored if it is determined to be invalid.

5. The method of claim 1, further comprising:

before sending a response message, determining, by the processor, whether there are any conflicts for sending the response message; and initiating a delay before sending the response message if conflicts are detected.

6. The method of claim 1, wherein the plurality of smart meters are communicably coupled in the grid area through a power line communication (PLC) network.

7. The method of claim 6, wherein the query message and the response message are transmitted on a dedicated channel in the PLC network.

8. The method of claim 1, wherein the first value comprise a hash value of the first unique identification number, and the second value comprises a hash value of the second unique identification number.

9. A method for identifying individual smart meters among a plurality of smart meters in a networked grid area by a host device, the host device including a processor, a memory, and a communications interface, the memory including instructions for execution by the processor for performing the method, the method comprising:

sending, by the communications interface, a query message to the smart meters in the networked grid area, the query message including a first value corresponding to a unique identification number of an individual smart meter of the plurality of smart meters, the first value comprising a hash value generated to designate the individual smart meter;

receiving, by the communications interface, a response message from the individual smart meter having the unique identification number;

assigning, by the processor, a logical identification number to the individual smart meter;

storing, in the memory, the logical identification number and the unique identification number; and sending, by the communications interface, the logical identification number to the individual smart meter.

10. The method of claim 9, wherein the grid area is networked through a power line communication (PLC) network.

11. The method of claim 10, wherein the query message and the response message are transmitted on a dedicated channel in the PLC network.

12. The method of claim 9, wherein storing the logical identification number and the unique identification number comprises storing the logical identification number and the unique identification number in a routing table in the memory.

13. The method of claim 9, wherein the host device comprises a smart meter among the plurality of smart meters.

14. The method of claim 9, wherein the first value comprises a hash value of the unique identification number.

15. The method of claim 9, wherein the method is repeated until all of the smart meters have provided a response message.

16. A smart grid having at least one host device and a plurality of smart meters, the host device and the plurality of smart meters being communicably coupled in the smart grid, wherein an identity of the smart meters in the smart grid is determined by performing a method comprising:

calculating, at the smart meters, a first value corresponding to an identification value unique to each smart meter;

sending, by the host device, a query message to the plurality of smart meters in the smart grid, the query message including a second value corresponding to the identification value unique to each smart meter;

receiving, at the smart meters, the query message;

determining, by each of the smart meters, if the second value included in the query message matches the calculated first value corresponding to the identification value unique to the smart meter; and sending, by each of the smart meters, a response message if the second value included in the query message matches the calculated first value corresponding to the identification value unique to the smart meter.

17. The method of claim 16, wherein the smart meters ignore the query message if the second value does not match the first value.

18. The method of claim 16, further comprising:

assigning a logical identification number to a responsive smart meter that sends the response message;

storing the assigned logical identification number and identification number unique to the responsive smart meter in a routing table; and sending an acceptance message including the assigned logical identification number to the responsive smart meter.

19. The method of claim 16, wherein the host device and the plurality of smart meters are communicably coupled in the smart grid through a power line communication (PLC) network.

20. The method of claim 19, wherein the query message and the response message are transmitted on a dedicated channel in the PLC network.

* * * * *